US007480380B2

(12) United States Patent
Brokenshire et al.

(10) Patent No.: US 7,480,380 B2
(45) Date of Patent: Jan. 20, 2009

(54) METHOD FOR EFFICIENT GENERATION OF MODULO INVERSE FOR PUBLIC KEY CRYPTOSYSTEMS

(75) Inventors: Daniel Alan Brokenshire, Round Rock, TX (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 10/926,598

(22) Filed: Aug. 26, 2004

(65) Prior Publication Data

US 2006/0045263 A1 Mar. 2, 2006

(51) Int. Cl.
*H04L 9/30* (2006.01)
(52) U.S. Cl. ........................................................ 380/30
(58) Field of Classification Search .................... 380/30
See application file for complete search history.

(56) References Cited

U.S. PATENT DOCUMENTS

| 4,200,770 | A | | 4/1980 | Hellman et al. | |
|---|---|---|---|---|---|
| 4,351,982 | A | * | 9/1982 | Miller et al. | 380/30 |
| 4,405,829 | A | | 9/1983 | Rivest et al. | |
| 6,763,366 | B2 | * | 7/2004 | Hars et al. | 708/491 |
| 7,277,540 | B1 | * | 10/2007 | Shiba et al. | 380/28 |
| 2003/0140077 | A1 | * | 7/2003 | Zaboronski et al. | 708/491 |

FOREIGN PATENT DOCUMENTS

RU          2012137 C1 *  4/1994

OTHER PUBLICATIONS

E. Savas and C.K. Koc, The Montgomery Modular-Inverse-Revisted, Jul. 2000, IEEE Transactions on Computers, vol. 49, No. 7, pp. 763-766.*
Rivest et al., "A Method for Obtaining Digital Signatures and Public-Key Cryptosystems", Communications of the ACM, vol. 21, No. 2, Feb. 1978, pp. 1-15.
Hahnfeld, Nils, "The Extended Euclidean Method", http://www.antilles.k12.vi.us/math/cryptotut/extended_euclidean_algorithm.htm, Mar. 15, 2002, Antilles School, St. Thomas, VI.
National Institute of Standards and Technology, "Digital Signature Standard (DSS)", FIPS Pub 186-2, Jan. 2000, Gaithersburg, MD.

* cited by examiner

*Primary Examiner*—Emmanuel L Moise
*Assistant Examiner*—Tamara Teslovich
(74) *Attorney, Agent, or Firm*—Stephen R. Tkacs; Stephen J. Walder, Jr.; Matthew B. Talpis

(57) ABSTRACT

A method, is provided for efficiently determining an inverse multiplicative modulo. In many public-key cryptographic algorithms, an inverse modulo is usually calculated in key generation. However, because many Reduced Instruction Set Computer (RISC) processors do not have the hardware support for division, good results are often not yielded. Therefore, to efficiently calculate hail an inverse modulo, a modified algorithm that utilizes a minimum of three division and two multiplications in conjunction with shifts and addition/subtractions is employed. The modified algorithm then is able to efficiently utilize the properties of the RISC processors to yield good results, especially when developing keys for public-key cryptographic algorithms.

5 Claims, 3 Drawing Sheets

METHOD FOR EFFICIENT GENERATION OF MODULO INVERSE FOR PUBLIC KEY CRYPTOSYSTEMS

FIELD OF THE INVENTION

The present invention relates generally to public key cryptosystems, and more particularly, to the generation of modulo inverse used in some cryptographic algorithms.

DESCRIPTION OF THE RELATED ART

In the field of information security, there are a variety of cryptographic algorithms available. Some common algorithms are RSA®, available from RSA Security, Inc., 20 Crosby Dr., Bedford Mass. 01730, Digital Security Standard (DSS), and Diffie-Hellman (DH). The DH method for encrypting/decrypting is described in U.S. Pat. No. 4,200,770 to Hellman et al. ("Hellman"), entitled "Cryptographic Apparatus and Method," issued on Apr. 29, 1980, which is hereby incorporated by reference. Additionally, the methodology behind the RSA® algorithm is described in U.S. Pat. No. 4,405,829 to Rivest et al. ("Rivest"), entitled "Cryptographic Communications System and Method," issued on Sep. 20, 1983, which is hereby incorporated by reference.

A basic principle behind these cryptographic algorithms is the utilization of public/private keys for message encryption or authentication. Unlike in symmetric-key algorithms where the same key is used for both encryption and decryption, in public-key algorithms, a pair of keys is used—one for encryption and the other for decryption. Referring to FIG. 1 of the drawings, the reference numeral 100 generally designates the process of utilizing public/private keys for cryptography. Typically, the process of encryption/decryption begins in step 102 with the generation of random keys from a key generator. There are a variety of manners to generate random keys, such as the use of a noisy amplifier with a polarity detector.

Once generated, then secure keys are generated in step 104. A secure key generator is usually employed that applies an algorithm to the randomly generated keys of an arbitrary length. From the applied algorithm, the secure key generator determines a public and a private key. The public key is available for public use, while the private key remains private. However, it is very difficult to derive the private key from the public key. A message encrypted with the public key can only be decrypted using the corresponding private key. Similarly, a message encrypted with the private key can only be decrypted using the corresponding public key.

After the public key is made available to the public in step 106, the public/private key pair can be used for message encryption or authentication in step 108. For message encryption in step 116, the message is first encrypted with the public key in step 118, and then transmitted to the entity holding the private key in step 120. The encrypted message can be transmitted over insecure channels since only the entity with the corresponding private key can decrypt it in step 114.

If the public/private key pair is used for message authentication, the message is first encrypted with the private key in step 110, and then the encrypted message is transmitted to the public or the entity who wants to verify the authenticity of the message in step 112. Insecure channels can be used for this transmission. The encrypted message is then decrypted in step 114 by the recipient using the corresponding public key, and its authenticity verified.

In some of these algorithms, specifically for public-key cryptosystems, there is a requirement for a generation of a modulo multiplicative inverse or a modulo inverse for two arbitrarily large integers during secure key generation. In other words, for a first integer (a) and a second integer (b), there is a third integer (g) such that the following holds:

$$1 = (b*g) \bmod a, \quad (1)$$

where mod or modulo is a function that determines the remainder of the product of the second integer (b) and the third integer (g) divided first integer (a). The third integer (g) is referred to as the modulo inverse of the second integer (b). For example, let the following hold:

$$a = 9 \quad (2)$$

$$b = 4. \quad (3)$$

Then, it would logically follow that the third integer (g) is 7 because $$(4*7) \bmod 9 = 28 \bmod 9 = 1. \quad (4)$$

However, there are also cases where no mod inverse exists, such as when the first integer is 15 and the second integer is 6. For a mod inverse to exist, however, the first integer and second integer must be relatively prime.

Therefore, a methodology is employed to determine the inverse mod. The above scheme, though, employs trial and error, which is not practical for large integers on the order of 2048 bits or more. Because the first integer and the second integer are relatively prime, the greatest common divisor (GCD) of the integers is equal to 1. A common technique for determining the GCD is the Euclidean method that does not require factorization of the integers. For the Euclidean method, let $$m, n \in Z, \text{ where } 1 < m < n. \quad (5)$$

It would follow that GCD(n, m)=GCD(m, n mod m). Then, an iteration by the GCD function on the result would then continue until the second term become zero. For example, let m=30 and n=42. Then, it would follow that $$\begin{aligned}\text{GCD}(42, 30) &= \text{GCD}(30, 42 \bmod 30) = \text{GCD}(30, 12) \\&= \text{GCD}(12, 30 \bmod 12) = \text{GCD}(12, 6) \\&= \text{GCD}(6, 12 \bmod 6) = \text{GCD}(6, 0).\end{aligned} \quad (6)$$

Therefore, the GCD of 30 and 42 is 6.

The Euclidean method can then be extended to not only compute the GCD of a first integer (a) and a second integer (b), but can be extended to compute a third integer (x) and a fourth integer (y) such that $$x*a + y*b = GCD(a, b), \quad (7)$$

which is known as the Extended Euclidean method. Firstly, the GCD is computed by the iteration of the GCD function until the second term is zero. If the GCD of the first integer (a) and of the second integer (b) is 1, then the mod inverse of the second integer (b) is equal to the fourth integer (y). However, either the third integer (x) or the fourth integer can be negative. If the fourth integer (y) is negative, then the mod inverse of the second integer (b) is equal to the first integer plus the fourth integer; otherwise, the mod inverse of the second integer (b) is equal to the fourth integer (y). For example, let a=9 and b=7. The GCD would be 1 because $$\begin{aligned}\text{GCD}(9, 7) &= \text{GCD}(7, 9 \bmod 7) = \text{GCD}(7, 2) = \text{GCD}(2, 7 \bmod 2) \\&= \text{GCD}(2, 1) = \text{GCD}(1, 2 \bmod 1) = \text{GCD}(1, 0).\end{aligned} \quad (8)$$

Therefore, the third integer (x) would be equal to −3, and the fourth integer would be equal to 4.

The Extended Euclidean method is typically utilized in the process of generating a secure key. However, the process of performing the Extended Euclidean method requires a substantial number of divisions because of the repetitions involved in computing the GCD. In many Reduced Instruction Set Computers (RISC), though, there is no support for hardware division. To perform divisions, the RISC processors employ software-based division, which may not yield good performance.

Therefore, there is a need for a method and/or apparatus that addresses at least some of the problems associated with conventional methods and/or apparatuses for computing a modulo multiplicative inverse.

SUMMARY OF THE INVENTION

The present invention provides an apparatus for generating an inverse modulo for at least one number of a pair of numbers. A secure key generator is employed. The secure key generator executes a maximum of 3 divisions, a maximum of 2 multiplications, and at least one operation selected from the group consisting of shift instructions, addition instructions, and subtraction instructions for at least one number.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
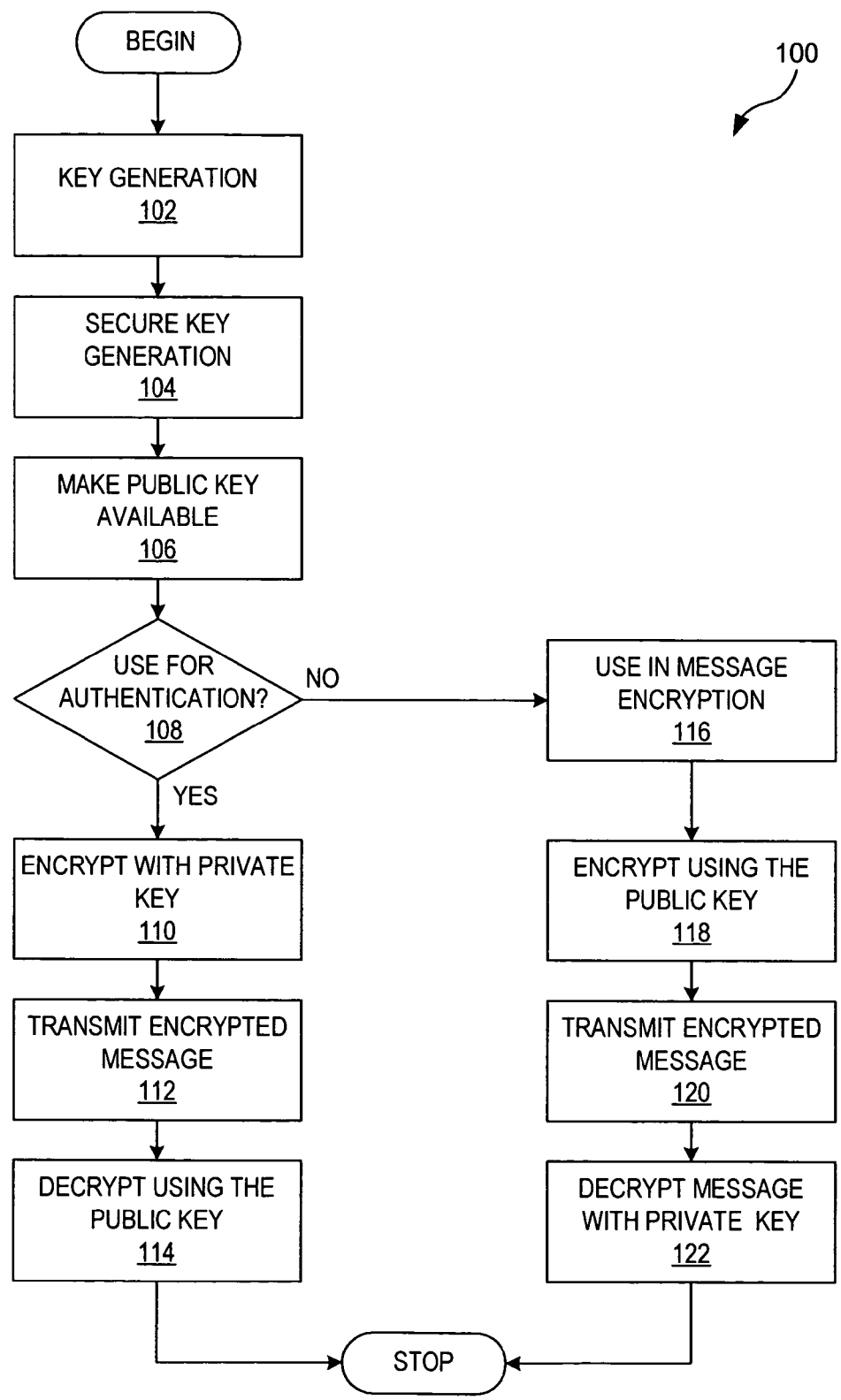
FIG. 1 is a flow chart depicting the process of utilizing public/private keys for encryption/decryption or verification.
Figure 2A:
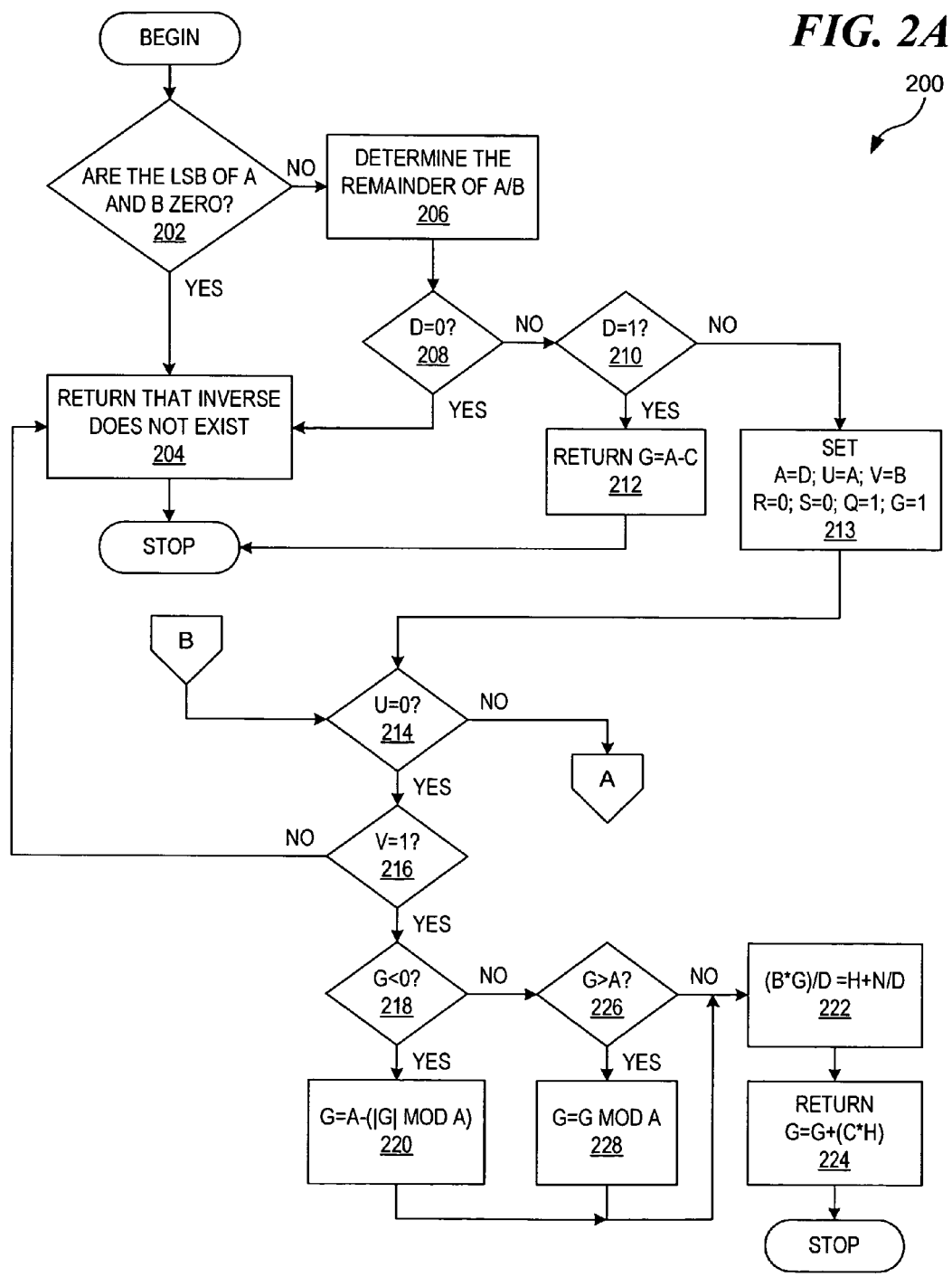
FIG. 2A and FIG. 2B are flow charts depicting a modified method for producing a modulo inverse for a first integer (a) and a second integer (b) that are arbitrarily large.

Referring to FIG. 2A of the drawings, the reference numeral 200 generally designates a modified method for producing a modulo inverse for a first integer (a) and a second integer (b) that are arbitrarily large.

In step 202, a determination is made as to whether the least significant bits (LSB) of first integer (a) and of second integer (b) are zero (0). An examination of the LSB of each of the two integers can allow for an immediate determination if the integers are odd or even. The LSB slot of the first integer (a) and the second integer (b) correspond to $2^0$. If the LSB is 0, then the integer is even, and if both numbers are even, then a return is made in step 204 stating that no inverse exists. For example, if the first integer (a) is 931 and the second integer is 12, then the LSB of the first integer would be 1, and the LSB of the second integer (b) is 0. Therefore, both numbers are not even.

In step 206, a determination is made of the remainder (d), where the second integer (b) is the divisor. In step 208, a determination is made as to whether the remainder (d) is zero (0). If the remainder (d) is 0, then, correspondingly, a return is made in step 204 stating that no inverse exists because the numerator is evenly divisible by the denominator. However, if a remainder (d) is not 0, then a determination is made as to whether the remainder (d) is 1 in step 210. If the remainder (d) is 1, then the inverse (g) is equal to the first integer (a) minus the quotient (c) of first integer (a) and the second integer (b) in step 212.

Otherwise, another set of steps must be employed. In step 213, a number of variables are set. The variables are set as follows: u=a=d, v=b, r=0, s=0, q=1, and g=1. Once the variables have been set, then a determination is made as to whether u is equal to 0 in step 214. A determination of whether u is equal to 0 determines whether the GCD has been reached. However, a GCD would only exist if the v is equal to 1. If u is equal to 0, a determination is made as to whether v is equal to 1 in step 216. If v is not equal to 1, then a return is made in step 204 stating that no inverse exists.

However, if v is equal to 1, then the inverse (g) can be computed. A determination is made as to whether the inverse (g) is negative in step 218. If the inverse (g) is less than 0, then, in step 220, the inverse (g) is set equal to the following: g=a−(|g|mod a). In step 222, the product of the second integer (b) and the inverse (g) is divided by the remainder (d), which has previously been reset, to yield a quotient (h) and a remainder (n). The inverse (g) is then iterated (in step 224) with the addition the product of the quotient (c) and of the quotient (h) as follows: g=g+c*h.

There are situations, however, where the inverse (g) is not less than 0. If the inverse (g) is not less than 0, then, in step 226, a determination is made as to whether the inverse (g) is greater than the first integer (a), which has previously been reset. If the inverse (g) is not greater than the first integer (a), then, in step 222, the product of the second integer (b) and the inverse (g) is divided by the remainder (d), which has previously been reset, to yield a quotient (h) and a remainder (n). The inverse (g) is then iterated (in step 224) with the addition the product of the quotient (c) and of the quotient (h) as follows: g=g+c*h. However, if (in step 226) the inverse (g) is not greater than the first integer (a), then, in step 228, the inverse (g) is set equal to the inverse (g) modulo the first integer (a). In step 222, the product of the second integer (b) and the inverse (g) is divided by the remainder (d) to yield a quotient (h) and a remainder (n). The inverse (g) is then iterated (in step 224) with the addition the product of the quotient (c) and of the quotient (h) as follows: g=g+c*h.

Figure 2B:
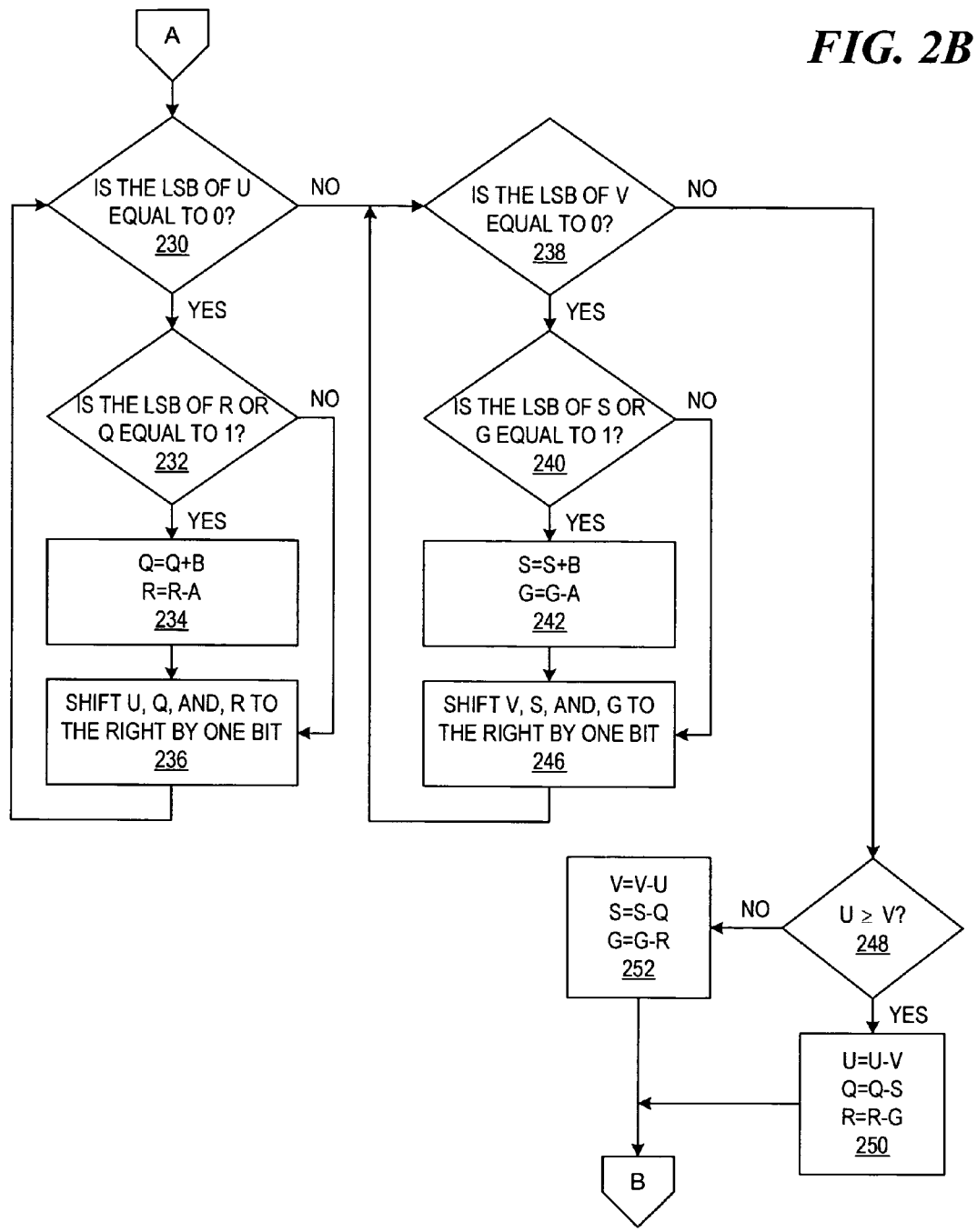

When the situation arises where u is not 0 (step 214), additional operations are performed. Referring to FIG. 2B of the drawings, a determination is made as to whether the LSB of u is equal to 0 in step 230. If the LSB of u is 0, then a determination is made as to whether the LSB of r or q is equal to 1 in step 232. If neither the LSB of r nor the LSB of q is equal to 1, then u, r, and q are each shifted to the right by one bit in step 236, and a determination is then made in step 230. If either the LSB of r or the LSB of q is equal to 1 (in step 232), then q is set equal to q plus the second integer (b) and r is iterated minus 1 in step 234. Then, u, r, and q are each shifted to the right by one bit in step 236, and a determination is then made in step 230.

Once the LSB of u is not 0, then operations may be performed on v. A determination is made as to whether the LSB of v is equal to 0 in step 238. If the LSB of V is 0, then a determination is made as to whether the LSB of s or g is equal to 1 in step 240. If neither the LSB of s nor the LSB of g is equal to 1, then v, s, and g are each shifted to the right by one bit in step 246, and a determination is then made in step 238. If either the LSB of s or the LSB of g is equal to 1, then s is set equal to s plus the second integer (b) and g is iterated minus the first integer (a) in step 242. Then, v, s, and g are each shifted to the right by one bit in step 246, and a determination is then made in step 238.

Once the LSB of v is not 0, then a determination is made as to whether u is greater than or equal to v in step 248. If u is greater than or equal to v, then in step 250, u, q, and r are reset as follows: u=u−v, q=q−s, and r=r−g. If v is greater than u, then in step 252, v, s, and g are reset as follows: v=v−u, s=s−q, and g=g−r. A determination is then made again in step 214. As a result, step 230 through step 236 can effectively modify u such that u will eventually become 1, and step 238 through step 246 can effectively modify v such that v will eventually become 1. Therefore, the conditions could then be met to effectively determine the inverse (g).

TABLE 1

| | Stage | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| a | 931 | — | 7 | — | — | — | — | — | — | — | — | — |
| b | 12 | — | — | — | — | — | — | — | — | — | — | — |
| c | — | 77 | — | — | — | — | — | — | — | — | — | — |
| d | — | 7 | — | — | — | — | — | — | — | — | — | — |
| u | — | — | 7 | — | 1 | — | — | — | 0 | — | — | — |
| v | — | — | 12 | 6 | — | 3 | 2 | 1 | — | — | — | — |
| q | — | — | 1 | — | −5 | — | — | — | −12 | — | — | — |
| r | — | — | 0 | — | 3 | — | — | — | 7 | — | — | — |
| s | — | — | 0 | 6 | — | 9 | 14 | 7 | — | — | — | — |
| g | — | — | 1 | −3 | — | −5 | −8 | −4 | — | 3 | — | 388 |
| h | — | — | — | — | — | — | — | — | — | — | 5 | — |

As an example, at a first stage if the first integer (a) is equal to 931 and if the second integer (b) is set equal to 12, then the Table 1 displays the stages for determining the inverse (g). At the second stage, the quotient (c) is 77, and the remainder (d) is 7. Obviously, an inverse does exist. At the third stage, the variables would Be set as follows: u=a=7, v=12, r=0, s=0, q=1, and g=1.

In transition between the third stage and the fourth stage, computations are performed. In third stage, u is equal to 7, meaning that the LSB of u is equal to 1, and v is equal to 12, meaning that LSB of v is equal to 0. As a result and because the LSB of the inverse (g) is equal to 1, s and the inverse (g) are reset as follows: s=12 and g=−6. Then, v, s, and g are bit shifted to the values at stage four: v=6, s=6, and g=−3.

Once completed, it is determined that u is greater than v, so that operations are performed on u, q, and r. The values u, q, and r are set equal to u−v, q−s, and r−g, respectively. The values of u, q, and r are 1, −5, and 3, respectively, as set forth in stage five of Table 1.

Between the fifth stage and the sixth stage, more computations are performed. In fifth stage, u is equal to 1, meaning that the LSB of u is equal to 1, and v is equal to 6, meaning that LSB of v is equal to 0. As a result and because the LSB of the inverse (g) is equal to 1, s and the inverse (g) are reset as follows: s=18 and g=−10. Then, v, s, and g are bit shifted to the values at stage six: v=3, s=9, and g=−5.

Then, it is determined that v is greater than u, so that operations are performed on v, s, and g. The values v, s, and g are set equal to v−u, s−q, and g−r, respectively. The values of v, s, and g are 2, 14, and −8, respectively, as set forth in stage seven of Table 1. Because, the value of v remains greater than u, two iterations are performed on v, s, and g to finally yield the values of 1, 7, and −4 in stage 8.

Then, between the eighth stage and the ninth stage, more computations are performed. It is determined that u is equal to v, so that operations are performed on u, q, and r. The values u, q, and r are set equal to u−v, q−s, and r−g, respectively. The values of u, q, and r are 0, −12, and 7, respectively, as set forth in stage nine of Table 1.

Because u has finally become 0, it is possible to then compute the final inverse (g). Since the inverse (g) is negative, then g is reset to a value of 3, as shown in stage ten. The quotient (h) of the product of the second integer (b) and the inverse (g) divided by the remainder (d) can then be determined to 5, as shown in stage eleven. Based on the computation of the quotient (h), the final inverse (g) is the inverse (g) plus the product of the quotient (c) and the quotient (h) to yield a value of 388 at stage twelve.

By utilizing the modified process 200, more favorable results can be obtained from RISC processors. There is a maximum of three divisions and two multiplications for determining a secure key for an arbitrarily large number. Mostly the modified process utilizes a plurality of shifts and additions/subtractions to determine the inverse modulo. The use of shifts and additions/subtractions can be easily handled by RISC processors, while divisions and multiplications are substantially more difficult. Therefore, the process 200 can more efficiently calculate the inverse modulo for an arbitrarily large number.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for efficient generation by a computer system of a modulo inverse for a public-key cryptosystem, comprising:

receiving, in the computer system, first value and a second value for generating one or more public keys for the public-key cryptosystem;

generating, in the computer system, a modulo inverse for the first value and the second value;

outputting the modulo inverse to the public-key cryptosystem to generate the one or more public keys; and performing an encryption function using the one or more public keys, wherein generating the modulo inverse comprises:

storing the first value in a first variable, A, and the second value in a second variable, B;

determining a remainder, D, of A divided by B;

responsive to D being greater than one, setting A to be equal to D; setting a third variable, U, to be equal to A; setting a fourth variable, V, to be equal to B; setting a fifth variable, R, to be equal to zero; setting a sixth variable, S, to be equal to zero; setting a seventh variable, Q, to be equal to one; and, setting a modulo inverse variable, G, to be equal to one;

performing the following until U=O:

responsive to U being even, repeatedly setting O=Q+B and R=R-A, if R or Q is odd, and shifting U, Q, and R to the right by one bit, until U is odd;

responsive to V being even, repeatedly setting S=S+B and G=G-A, if S or G is odd, and shifting V, S, and G to the right by one bit until V is odd;

setting V=V-U and S=S-Q and G=G-R if U is less than V; and setting U=U-V and Q=Q-S and R=R-G if U is greater than or equal to V;

responsive to V being equal to one, performing the following:

responsive to G being less than zero, setting G=A-(|G| MOD A);

responsive to G being greater than A, setting G=G MOD A;

determining a quotient, H, and a remainder, N, based on the modulo inverse variable, G; and determining the modulo inverse based on G, H, and a quotient of A and B.

2. The method of claim 1, wherein generating the modulo inverse further comprises:

responsive to both A and B being even, returning a result that no modulo inverse exists for the first value and the second value.

3. The method of claim 1, wherein generating the modulo inverse further comprises:

responsive to D being eciual to zero, returning a result that no modulo inverse exists for the first value and the second value.

4. The method of claim 1, wherein generating the modulo inverse further comprises:

responsive to V not being equal to zero, returning a result that no modulo inverse exists for the first value and the second value.

5. The method of claim 1, wherein generating the modulo inverse further comprises responsive to D being equal to one, setting G=A-C, wherein C is equal to a quotient of the first value and the second value.

* * * * *